(12) United States Patent
Shiraishi et al.

(10) Patent No.: US 9,513,408 B2
(45) Date of Patent: Dec. 6, 2016

(54) ANTIMONY-DOPED TIN OXIDE POWDER AND METHOD OF PRODUCING THE SAME

(71) Applicants: MITSUBISHI MATERIALS CORPORATION, Tokyo (JP); Mitsubishi Materials Electronic Chemicals Co., Ltd., Akita-shi (JP)

(72) Inventors: Shinya Shiraishi, Akita (JP); Hirotoshi Umeda, Akita (JP); Suzuo Sasaki, Akita (JP)

(73) Assignees: MITSUBISHI MATERIALS CORPORATION, Tokyo (JP); MITSUBISHI MATERIALS ELECTRONIC CHEMICALS CO., LTD., Tokyo (JP)

(*) Notice: Subject to any disclaimer, the term of this patent is extended or adjusted under 35 U.S.C. 154(b) by 64 days.

(21) Appl. No.: 14/388,478

(22) PCT Filed: Mar. 28, 2013

(86) PCT No.: PCT/JP2013/059276
§ 371 (c)(1),
(2) Date: Sep. 26, 2014

(87) PCT Pub. No.: WO2013/147029
PCT Pub. Date: Oct. 3, 2013

(65) Prior Publication Data
US 2015/0090943 A1    Apr. 2, 2015

(30) Foreign Application Priority Data
Mar. 29, 2012    (JP) .................. 2012-076044

(51) Int. Cl.
*H01B 1/02* (2006.01)
*G02B 1/10* (2015.01)
(Continued)

(52) U.S. Cl.
CPC ............... *G02B 1/10* (2013.01); *C01G 19/02* (2013.01); *C01G 30/00* (2013.01); *C09C 3/06* (2013.01);
(Continued)

(58) Field of Classification Search
CPC ...... C01G 19/02; C01G 30/02; C01G 19/00; C04B 35/457; C08K 2003/2231

USPC .................. 252/519.1, 519.33, 520.1
See application file for complete search history.

(56) References Cited

U.S. PATENT DOCUMENTS

| 5,330,833 A | * | 7/1994 | Yamashita | C01G 19/02 252/519.1 |
| 5,401,441 A | * | 3/1995 | Robert | C01G 19/02 252/520.1 |
| 5,788,887 A | * | 8/1998 | Swanson | B82Y 30/00 252/519.1 |

FOREIGN PATENT DOCUMENTS

| CN | 100467386 C | 3/2009 |
| JP | 58-091777 A | 5/1983 |

(Continued)

OTHER PUBLICATIONS

I.S. Mulla et al., "Electron spectroscopic studies on films of $SnO_2$ and $SnO_2$:Sb", Surface and Coatings Technology, 1987, vol. 31, pp. 77-88.
Seung-Yup Lee et al., "Structural, electrical and optical characteristics of $SnO_2$:Sb thin films by ultrasonic spray pyrolysis", Thin Solid Films, Available online Feb. 3, 2006, vol. 510, pp. 154-158.
International Search Report mailed Apr. 23, 2013, issued for PCT/JP2013/059276.

(Continued)

*Primary Examiner* — Khanh Tuan Nguyen
(74) *Attorney, Agent, or Firm* — Locke Lord LLP; James E. Armstrong, IV; Julie Tabarovsky

(57) ABSTRACT

This antimony-doped tin oxide powder is an antimony-doped tin oxide powder characterized by: (A) including at least three kinds of ions selected from the group consisting of $Sn^{2+}$, $Sn^{4+}$, $Sb^{3+}$ and $Sb^{5+}$; (B) having a ratio of average Sn ionic radius to average Sb ionic radius of 1:(0.96 to 1.04); and (C) having an Sb content of 5 to 25 moles relative to a total of 100 moles of Sb and Sn, wherein the average Sn ionic radius is the average of ionic radii of $Sn^{2+}$ and $Sn^{4+}$, while the average Sb ionic radius is the average of ionic radii of $Sb^{3+}$ and $Sb^{5+}$.

8 Claims, 1 Drawing Sheet

(51) Int. Cl.
*C01G 19/02* (2006.01)
*C01G 30/00* (2006.01)
*C09C 3/06* (2006.01)
*C09D 5/32* (2006.01)
*C09D 7/12* (2006.01)
*C09D 201/00* (2006.01)
*C09D 5/24* (2006.01)
*G02B 5/20* (2006.01)
*H01B 1/08* (2006.01)

(52) U.S. Cl.
CPC . *C09D 5/24* (2013.01); *C09D 5/32* (2013.01); *C09D 7/12* (2013.01); *C09D 7/1225* (2013.01); *C09D 201/00* (2013.01); *G02B 5/208* (2013.01); *H01B 1/08* (2013.01); *C01P 2002/50* (2013.01); *C01P 2002/54* (2013.01); *C01P 2002/72* (2013.01); *C01P 2002/82* (2013.01); *C01P 2006/12* (2013.01); *C01P 2006/40* (2013.01)

(56) References Cited

FOREIGN PATENT DOCUMENTS

| | | |
|---|---|---|
| JP | 07-069632 A | 3/1995 |
| JP | 10-251018 A | 9/1998 |
| JP | 2003-176132 A | 6/2003 |
| JP | 2004-083397 A | 3/2004 |
| JP | 2004-149329 A | 5/2004 |
| WO | WO-2008/127409 A2 | 10/2008 |

OTHER PUBLICATIONS

Wu Jian-qing et al., "Preparation of ATO-Coated Conductive Fiber", Journal of South China University of Technology(Natural Science Edition), Aug. 2007, vol. 35, No. 8, 5 sheets.

Office Action mailed Jul. 9, 2015, issued for the Chinese patent application No. 201380016607.2 and English translation of the search report.

* cited by examiner

ANTIMONY-DOPED TIN OXIDE POWDER AND METHOD OF PRODUCING THE SAME

TECHNICAL FIELD

The present invention relates to an antimony tin oxide powder excellent in infrared cut-off characteristics and a method of producing the same.

Priority is claimed on Japanese Patent Application No. 2012-076044, filed Mar. 29, 2012, the content of which is incorporated herein by reference.

BACKGROUND ART

For the construction materials and window materials for vehicles, such as automobiles, trains, ships and airplanes, the window materials for housing and the glass plates used in showcases, in addition to transparency, electrical conductivity for preventing electrostatic charges and infrared cut-off characteristics are required in some cases. As materials for such applications, indium tin oxide powders and antimony-doped tin oxide powders have been known. Here, although indium tin oxide powders exhibit excellent transparency and infrared cutting performance and are thus advantageous, it incurs a high cost because they are expensive. On the other hand, although antimony-doped tin oxide powders are inexpensive as compared with indium tin oxide powders, there are problems not only of low visible light transmittance which makes it impossible to cope with the demand for high transparency, but also of the infrared cutting performance being inferior to that of indium tin oxide powders.

On the other hand, although there are applications as long as the infrared cut-off characteristics are favorable even if the visible light transmittance is about 70%, the currently available antimony-doped tin oxide powders do not necessarily exhibit satisfactory infrared cut-off characteristics.

Although the inventors of the present invention considered that an increase in the amount of antimony added was necessary in order to improve the infrared cut-off characteristics of antimony-doped tin oxide powders, if the amount of antimony addition was increased by a known method (see Patent Document 1), there were problems in that a portion of antimony was not incorporated into the crystal lattice of tin oxide and was not doped, and that the crystallinity of antimony-doped tin oxide was reduced, which lowered the electrical conductivity.

PRIOR ART DOCUMENTS

Patent Documents

Patent Document 1: Japanese Unexamined Patent Application, First Publication No. S 58-91777

DISCLOSURE OF INVENTION

Problems to be Solved by the Invention

The present invention is intended to solve the above problems, with an object of providing an antimony-doped tin oxide powder exhibiting high electrical conductivity and high infrared cut-off characteristics.

Means to Solve the Problems

The present invention relates to the antimony-doped tin oxide powder and the production method thereof that solves the above problems by the following configurations.

[1] An antimony-doped tin oxide powder characterized by:
(A) including at least three kinds of ions selected from the group consisting of $Sn^{2+}$, $Sn^{4+}$, $Sb^{3+}$ and $Sb^{5+}$;
(B) having a ratio of an average Sn ionic radius (an average of $Sn^{2+}$ ionic radius and $Sn^{4+}$ ionic radius) to an average Sb ionic radius (an average of $Sb^{3+}$ ionic radius and $Sb^{5+}$ ionic radius) which is represented by the following formula (I); and
(C) having an Sb content of 5 to 25 moles relative to a total of 100 moles of Sb and Sn, wherein (average Sn ionic radius):(average Sb ionic radius)=1:(0.96 to 1.04)    (1).

[2] A method of producing an antimony-doped tin oxide powder, the method characterized by:
co-precipitating hydroxides of Sb and Sn from an aqueous solution of a raw material; and
firing co-precipitated hydroxides,
wherein the raw material includes at least three types selected from the group consisting of $SnCl_2$, $SnCl_4$, $SbCl_3$ and $SbCl_5$,
a ratio of an average Sn ionic radius (an average of $Sn^{2+}$ ionic radius and $Sn^{4+}$ ionic radius) to an average Sb ionic radius (an average of $Sb^{3+}$ ionic radius and $Sb^{5+}$ ionic radius) is represented by the following formula (2); and
an Sb content is 5 to 25 moles relative to a total of 100 moles of Sb and Sn, wherein (average Sn ionic radius):(average Sb ionic radius)=1:(0.96 to 1.04)    (2).

[3] The method of producing an antimony-doped tin oxide powder according to the above aspect [2], further including:
a step of preparing an Sn-containing aqueous solution including $SnCl_2$ and $SnCl_4$, which contains $SnCl_4$ in an amount of 2 to 40 moles relative to a total of 100 moles of $SnCl_2$ and $SnCl_4$,
a step of preparing an Sb-added aqueous solution containing $SbCl_3$, and
a step of mixing the Sn-containing aqueous solution and the Sb-added aqueous solution to prepare an Sb-added, Sn-containing aqueous solution, wherein
hydroxides of Sb and Sn are co-precipitated from the Sb-added, Sn-containing aqueous solution.

[4] The method of producing an antimony-doped tin oxide powder according to the above aspect [2], further including:
a step of preparing an Sb-added aqueous solution including $SbCl_3$ and $SbCl_5$, which contains $SbCl_5$ in an amount of 44 to 66 moles relative to a total of 100 moles of $SbCl_3$ and $SbCl_5$,
a step of preparing an Sn-containing aqueous solution containing $SnCl_4$, and
a step of mixing the Sb-added aqueous solution and the Sn-containing aqueous solution to prepare an Sb-added, Sn-containing aqueous solution, wherein
hydroxides of Sb and Sn are co-precipitated from the Sb-added, Sn-containing aqueous solution.

[5] A dispersion obtained by dispersing the antimony-doped tin oxide powder according to the above aspect [1].

[6] A coating material including the antimony-doped tin oxide powder according to the above aspect [1], and a resin.

[7] A heat-ray shielding transparent film including the antimony-doped tin oxide powder according to the above aspect [1].

[8] The heat-ray shielding transparent film according to the above aspect [7], wherein a value of [(visible light transmittance)/(solar radiation transmittance)] is at least 1.25 when the visible light transmittance is from 83 to 87%.

Effects of the Invention

According to the aspect [1] of the present invention, it is possible to provide an antimony-doped tin oxide powder with high electrical conductivity and high infrared cut-off characteristics.

In addition, according to the aspect [2] of the present invention, it is possible to easily produce an antimony-doped tin oxide powder with high conductivity and high infrared cut-off characteristics.

Since a coating film exhibiting high electrical conductivity and high infrared cut-off characteristics can be easily obtained according to the aspect [5] or [6] of the present invention, the dispersion described in [5] and coating material described in [6] can easily be applied to the construction materials and window materials for vehicles, such as automobiles, trains, ships and airplanes, the window materials for housing, and the glass plates used in showcases or the like.

BEST MODE FOR CARRYING OUT THE INVENTION

Figure 1:
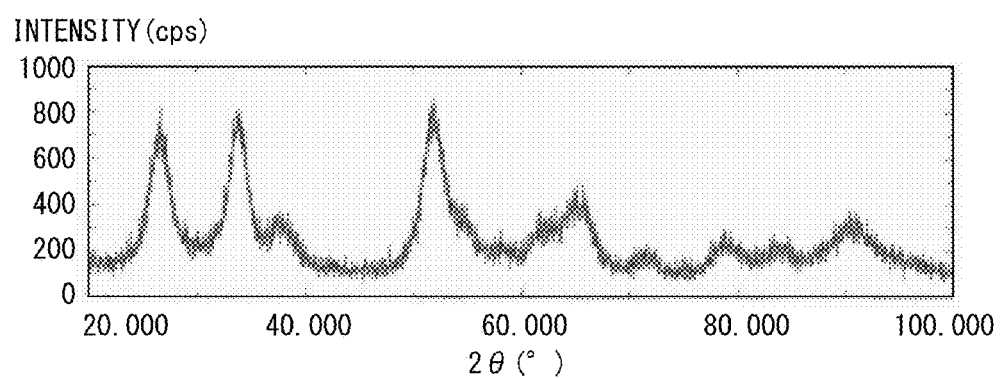
FIG. 1 is a diagram showing the results of X-ray diffraction of the antimony tin oxide powder of Example 10.

Hereinafter, the present invention will be described in more detail based on embodiments thereof. It should be noted that the symbol "%" refers to "% by mass", unless indicated otherwise, and except those cases where it is specific to the numerical value.

[Antimony-Doped Tin Oxide Powder]

An antimony-doped tin oxide powder according to the present embodiment is characterized by:

(A) including at least three kinds of ions selected from the group consisting of $Sn^{2+}$, $Sn^{4+}$, $Sb^{3+}$ and $Sb^{5+}$;

(B) having a ratio of an average Sn ionic radius (an average of $Sn^{2+}$ ionic radius and $Sn^{4+}$ ionic radius) to an average Sb ionic radius (an average of $Sb^{3+}$ ionic radius and $Sb^{5+}$ ionic radius) which is represented by the following formula (1); and (C) having an Sb content of 5 to 25 moles relative to a total of 100 moles of Sb and Sn, wherein (average Sn ionic radius):(average Sb ionic radius)=1:(0.96 to 1.04)      (1).

It should be noted that the ratio (average Sn ionic radius):(average Sb ionic radius) is preferably 1:(0.98 to 1.04) and more preferably 1:(0.98 to 1.02).

In addition, the Sb content is preferably from 8 to 25 moles and more preferably from 9 to 22 moles relative to a total of 100 moles of Sb and Sn.

First, a relationship between the average Sn ionic radius and the average Sb ionic radius will be described. The ionic radius of $Sn^{4+}$ is 74 pm, the ionic radius of $Sn^{2+}$ is 93 pm, the ionic radius of $Sb^{5+}$ is 62 pm and the ionic radius of $Sb^{3+}$ is 89 pm. In the case of producing an antimony-doped tin oxide from $Sn^{4+}$ and $Sb^{5+}$, the ratio of the ionic radius of $Sn^{4+}$ and $Sb^{5+}$ will be about (1:0.84), and if the amount of Sb is increased in order to improve the infrared cut-off characteristics, a portion of antimony would not be incorporated into the crystal lattice of tin oxide and would not be doped. In addition, the crystallinity of antimony-doped tin oxide is reduced, and the electrical conductivity is lowered. On the other hand, in the case of producing from $Sn^{4+}$ and $Sb^{3+}$, the ratio of the ionic radius of $Sn^{4+}$ and $Sb^{3+}$ will be about (1:1.20), and if the amount of Sb is increased, a portion of antimony would not be incorporated into the crystal lattice of tin oxide and would not be doped. In addition, the crystallinity of antimony-doped tin oxide is reduced, and the electrical conductivity is lowered.

Table 1 shows the ratio of the average ionic radius when using $Sn^{4+}$ as Sn ions and $Sb^{5+}$ and $Sb^{3+}$ as Sb ions. The average Sb ionic radius is determined by the weighted average of the ratio of $Sb^{5+}$ and the ratio of $Sb^{3+}$. Here, the ionic radius of $Sb^{5+}$ is denoted as $R_{Sb5}$ and the ionic radius of $Sb^{3+}$ is denoted as $R_{Sb3}$, and the average Sb ionic radius $(R_{Sb})$, when the molar ratio of $Sb^{5+}$ relative to the total of 1 mole of the molar ratio of $Sb^{5+}$ and the molar ratio of $Sb^{3+}$ is x mole, is shown in the following formula (2).

$$(R_{Sb})=(R_{Sb5})\times(x)+(R_{Sb3})\times(1-x) \quad (2)$$

It should be noted that the ratio of $Sb^{5+}$ and the ratio of $Sb^{3+}$ shown in Table 1 are expressed in molar ratios.

Further, the ratio of the average ionic radius, when using $Sn^{4+}$ as Sn ions and $Sb^{5+}$ and $Sb^{3+}$ as Sb ions, is determined by the formula (3).

$$\text{(Ratio of the average ionic radius)}=(R_{Sb})/(\text{Ionic radius of } Sn^{4+}) \quad (3)$$

TABLE 1

| | | | | | | | | | | | |
|---|---|---|---|---|---|---|---|---|---|---|---|
| $Sb^{5+}$ ratio | 0.00 | 0.10 | 0.30 | 0.40 | 0.44 | 0.50 | 0.60 | 0.66 | 0.70 | 0.90 | 1.00 |
| $Sb^{3+}$ ratio | 1.00 | 0.90 | 0.70 | 0.60 | 0.56 | 0.50 | 0.40 | 0.34 | 0.30 | 0.10 | 0.00 |
| Average Sb ionic radius | 89.0 | 86.3 | 80.9 | 78.2 | 77.1 | 75.5 | 72.8 | 71.2 | 70.1 | 64.7 | 62.0 |
| Ratio of average ionic radius (Sn = 1) | 1.20 | 1.17 | 1.09 | 1.06 | 1.04 | 1.02 | 0.98 | 0.96 | 0.95 | 0.87 | 0.84 |

As can be seen from Table 1, in the case of using $Sn^{4+}$ as Sn ions, if $Sb^{5+}$ is from 0.44 to 0.66 moles relative to the total of 1 mole of $Sb^{5+}$ and $Sb^{3+}$, the ratio (average Sn ionic radius):(average Sb ionic radius) would be 1:(1.04 to 0.96), and even when the amount of Sb addition is increased in order to enhance the infrared cut-off characteristics, it is possible to obtain an antimony-doped tin oxide powder in which the crystallinity of the antimony-doped tin oxide is high, in other words, the electrical conductivity is high.

Next, Table 2 shows the ratio of the average ionic radius when using $Sb^{3+}$ as Sb ions and $Sn^{4+}$ and $Sn^{2+}$ as Sn ions. The average Sn ionic radius is determined by the weighted average of the ratio of $Sn^{4+}$ and the ratio of $Sn^{2+}$. Here, the ionic radius of $Sn^{4+}$ is denoted as $R_{Sn4}$ and the ionic radius of $Sn^{2+}$ is denoted as $R_{Sn2}$, and the average Sn ionic radius $(R_{Sn})$, when the molar ratio of $Sn^{4+}$ relative to the total of 1 mole of the molar ratio of $Sn^{4+}$ and the molar ratio of $Sn^{2+}$ is y mole, is shown in the following formula (4).

$$(R_{Sn})=(R_{Sn4})\times(y)+(R_{Sn2})\times(1-y) \quad (4)$$

It should be noted that the ratio of $Sn^{4+}$ and the ratio of $Sn^{2+}$ shown in Table 2 are expressed in molar ratios.

Further, the ratio of the average ionic radius, when using $Sb^{3+}$ as Sb ions and $Sn^{4+}$ and $Sn^{2+}$ as Sn ions, is determined by the formula (5).

$$\text{(Ratio of the average ionic radius)} = \text{(Ionic radius of } Sb^{3+})/(R_{Sn}) \quad (5)$$

TABLE 2

| | | | | | | | | | | | |
|---|---|---|---|---|---|---|---|---|---|---|---|
| $Sn^{4+}$ ratio | 0.0 | 0.02 | 0.10 | 0.30 | 0.40 | 0.50 | 0.60 | 0.70 | 0.80 | 0.90 | 1.00 |
| $Sn^{2+}$ ratio | 1.0 | 0.98 | 0.90 | 0.70 | 0.60 | 0.50 | 0.40 | 0.30 | 0.20 | 0.10 | 0.00 |
| Average Sn ionic radius | 93.0 | 92.6 | 91.1 | 87.3 | 85.4 | 83.5 | 81.6 | 79.7 | 77.8 | 75.9 | 74.0 |
| Ratio of average ionic radius (Sn = 1) | 0.957 | 0.961 | 0.98 | 1.02 | 1.04 | 1.07 | 1.09 | 1.12 | 1.14 | 1.17 | 1.20 |

As can be seen from Table 2, in the case of using $Sb^{3+}$ as Sb ions, if $Sn^{4+}$ is from 0.02 to 0.40 moles relative to the total of 1 mole of $Sn^{4+}$ and $Sn^{2+}$, the ratio (average Sn ionic radius):(average Sb ionic radius) would be 1:(0.96 to 1.04), and even when the amount of Sb addition is increased in order to enhance the infrared cut-off characteristics, it is possible to obtain an antimony-doped tin oxide powder in which the crystallinity of the antimony-doped tin oxide is high, in other words, the electrical conductivity is high.

Next, Table 3 shows the ratio of the average ionic radius when using $Sb^{5+}$ and $Sb^{3+}$ at a molar ratio of 1:2 (average Sb ionic radius: 80 pm) as Sb ions and $Sn^{4+}$ and $Sn^{2+}$ as Sn ions. The average Sn ionic radius is determined by the weighted average of the ratio of $Sn^{4+}$ and the ratio of $Sn^{2+}$. Here, the ionic radius of $Sn^{4+}$ is denoted as $R_{Sn4}$ and the ionic radius of $Sn^{2+}$ is denoted as $R_{Sn2}$, and the average Sn ionic radius ($R_{Sn}$), when the molar ratio of $Sn^{4+}$ relative to the total of 1 mole of the molar ratio of $Sn^{4+}$ and the molar ratio of $Sn^{2+}$ is p mole, is shown in the following formula (6).

$$(R_{Sn}) = (R_{Sn4}) \times (p) + (R_{Sn2}) \times (1-p) \quad (6)$$

It should be noted that the ratio of $Sn^{4+}$ and the ratio of $Sn^{2+}$ shown in Table 3 are expressed in molar ratios.

The average Sb ionic radius is determined by the weighted average of the ratio of $Sb^{5+}$ and the ratio of $Sb^{3+}$. Here, the ionic radius of $Sb^{5+}$ is denoted as $R_{Sb5}$ and the ionic radius of $Sb^{3+}$ is denoted as $R_{Sb3}$, and the average Sb ionic radius ($R_{Sb}$), when the molar ratio of $Sb^{5+}$ relative to the total of 1 mole of the molar ratio of $Sb^{5+}$ and the molar ratio of $Sb^{3+}$ is q mole, is shown in the following formula (7).

$$(R_{Sb}) = (R_{Sb5}) \times (q) + (R_{Sb3}) \times (1-q) \quad (7)$$

Further, the ratio of the average ionic radius, when using $Sb^{5+}$ and $Sb^{3+}$ as Sb ions and $Sn^{4+}$ and $Sn^{2+}$ as Sn ions, is determined by the formula (8).

$$\text{(Ratio of the average ionic radius)} = (R_{Sb})/(R_{Sn}) \quad (8)$$

the ratio (average Sn ionic radius):(average Sb ionic radius) would be 1:(0.96 to 1.04), and even when the amount of Sb addition is increased in order to enhance the infrared cut-off characteristics, it is possible to obtain an antimony-doped tin oxide powder in which the crystallinity of the antimony-doped tin oxide is high, in other words, the electrical conductivity is high. Since it is possible to control the electrical conductivity of antimony-doped tin oxide powder by the ratio of $Sn^{4+}$ and $Sn^{2+}$, in the case of using four types of raw materials, by adjusting the ratio of $Sn^{4+}$ and $Sn^{2+}$ so as to attain a desired electrical conductivity, it is also possible to back calculate the molar ratio of $Sb^{5+}$ and $Sb^{3+}$ such that the desired ratio of the average Sn ionic radius and the average Sb ionic radius is achieved. Here, the quantitative determination of $Sn^{2+}$, $Sn^{4+}$, $Sb^{3+}$ and $Sb^{5+}$ is carried out by X-ray photoelectron spectroscopy (XPS).

Next, the Sb content is from 5 to 25 moles relative to a total of 100 moles of Sb and Sn, and is preferably from 8 to 25 moles in order to enhance the infrared cut-off characteristics. Here, the quantitative measurement of Sb and Sn is carried out by inductively coupled plasma emission spectrometry.

It is preferable that the antimony-doped tin oxide powder have a color indicated by an L value of 50 or less in the Lab color system because the infrared cut-off characteristics increase, and an L value of 40 or less is more preferred because the infrared cut-off characteristics increase. Here, the L value is measured using a color computer (model number: SM-7) manufactured by Suga Test Instruments Co., Ltd. It should be noted that the L value is preferably 6 or more from the viewpoint of the transparency of the heat-ray shielding transparent film that contains the antimony-doped tin oxide powder.

It is preferable that the antimony-doped tin oxide powder have a BET specific surface area of 50 m²/g or more because the infrared cut-off characteristics increase, and a BET specific surface area of 70 m²/g or more is more preferred because the infrared cut-off characteristics increase. It should be noted that the BET specific surface area is preferably not greater than 120 m²/g from the viewpoint of the handling properties of the antimony-doped tin oxide powder.

The powder volume resistivity of the antimony-doped tin oxide powder can be made to be 20 Ω·cm or less. Here, a sample powder is placed in a pressure vessel and com-

TABLE 3

| | | | | | | | | | | | |
|---|---|---|---|---|---|---|---|---|---|---|---|
| $Sn^{4+}$ ratio | 0.00 | 0.10 | 0.20 | 0.40 | 0.51 | 0.60 | 0.70 | 0.80 | 0.84 | 0.90 | 1.00 |
| $Sn^{2+}$ ratio | 1.00 | 0.90 | 0.80 | 0.60 | 0.49 | 0.40 | 0.30 | 0.20 | 0.16 | 0.10 | 0.00 |
| Average Sn ionic radius | 93.0 | 91.1 | 89.2 | 85.4 | 83.3 | 81.6 | 79.7 | 77.8 | 77.0 | 75.9 | 74.0 |
| Ratio of average ionic radius (Sn = 1) | 0.86 | 0.88 | 0.90 | 0.94 | 0.96 | 0.98 | 1.00 | 1.03 | 1.04 | 1.05 | 1.08 |

As can be seen from Table 3, in the case of using $Sb^{5+}$ and $Sb^{3+}$ at a molar ratio of 1:2 as Sb ions, if $Sn^{4+}$ is from 0.51 to 0.84 moles relative to the total of 1 mole of $Sn^{4+}$ and $Sn^{2+}$, pressed at 980 N, and the powder volume resistivity is measured by a digital multimeter using the resulting compressed powder.

The infrared cut-off characteristics can be evaluated by measuring the visible light transmittance (% Tv, wavelength range: 380 to 780 nm) and the solar radiation transmittance (% Ts, wavelength range: 300 to 2,500 nm) and calculating a ratio [(% Tv)/(% Ts)]. Here, in order to measure the visible light transmittance and the solar radiation transmittance, the antimony-doped tin oxide powder is first dispersed, and the resulting dispersed liquid is mixed with a resin to form a coating material. Next, the thus obtained coating material is applied onto a transparent film and is then dried to produce a heat-ray shielding composition film. Then, after measuring the visible light transmittance and solar radiation transmittance of the film on which no coating material has been applied as a background, the visible light transmittance and solar radiation transmittance of the film on which a heat-ray shielding composition film has been formed are measured using a spectrophotometer (model number: U-4000) manufactured by Hitachi, Ltd.

[Production Method of Antimony-Doped Tin Oxide Powder]

A method of producing an antimony-doped tin oxide powder according to the present embodiment is characterized by:

co-precipitating hydroxides of Sb and Sn from an aqueous solution of a raw material; and firing the co-precipitated hydroxides, wherein the raw material includes at least three types selected from the group consisting of $SnCl_2$, $SnCl_4$, $SbCl_3$ and $SbCl_5$, a ratio of an average Sn ionic radius (an average of $Sn^{2+}$ ionic radius and $Sn^{4+}$ ionic radius) to an average Sb ionic radius (an average of $Sb^{3+}$ ionic radius and $Sb^{5+}$ ionic radius) is represented by the following formula (9);

and an Sb content is from 5 to 25 moles relative to a total of 100 moles of Sb and Sn, wherein $$(\text{average Sn ionic radius}):(\text{average Sb ionic radius})=1:(0.96 \text{ to } 1.04) \quad (9).$$

When using $SnCl_2$, $SnCl_4$ and $SbCl_3$ as raw materials, it is preferable to mix an Sn-containing aqueous solution including $SnCl_2$ and $SnCl_4$, which contains $SnCl_4$ in an amount of 2 to 40 moles relative to a total of 100 moles of $SnCl_2$ and $SnCl_4$, with an Sn-containing aqueous solution containing $SbCl_3$ to thereby prepare an Sb-added, Sn-containing aqueous solution, and to co-precipitate the hydroxides of Sb and Sn from the Sb-added, Sn-containing aqueous solution, because the ratio represented by the formula (10) is achieved:

$$(\text{average Sn ionic radius}):(\text{average Sb ionic radius})=1:(0.96 \text{ to } 1.04) \quad (10).$$

As described above, if an $SbCl_3$ aqueous solution is used when mixing $SbCl_3$, it is possible to easily make the Sb-added, Sn-containing aqueous solution uniform, which is preferable.

Further, when using $SnCl_4$, $SbCl_3$ and $SbCl_5$ as raw materials, it is preferable to mix an Sb-added aqueous solution including $SbCl_3$ and $SbCl_5$, which contains $SbCl_5$ in an amount of 44 to 66 moles relative to a total of 100 moles of $SbCl_3$ and $SbCl_5$, with an Sn-containing aqueous solution containing $SnCl_4$ to thereby prepare an Sb-added, Sn-containing aqueous solution, and to co-precipitate the hydroxides of Sb and Sn from the Sb-added, Sn-containing aqueous solution, because the ratio represented by the formula (11) is achieved:

$$(\text{average Sn ionic radius}):(\text{average Sb ionic radius})=1:(0.96 \text{ to } 1.04) \quad (11).$$

As described above, if an $SnCl_4$ aqueous solution is used when mixing $SnCl_4$, it is possible to easily make the Sb-added, Sn-containing aqueous solution uniform, which is preferable.

It is preferable to use an aqueous hydrochloric acid solution, as an aqueous solution of at least three types selected from the group consisting of $SnCl_2$, $SnCl_4$, $SbCl_3$ and $SbCl_5$, from the viewpoints of the solubility of the raw materials and the uniformity of the co-precipitation reaction. Further, the concentrations of $SnCl_2$, $SnCl_4$, $SbCl_3$ and $SbCl_5$ in the aqueous solution is preferably from 1 to 80% by mass, from the viewpoints of the solubility of the raw materials, the uniformity of the co-precipitation reaction, and the productivity.

An aqueous alkaline solution is used in order to co-precipitate the hydroxides of Sb and Sn from the aqueous solution of raw materials. Examples of the alkali used in the aqueous alkaline solution include the hydroxides and carbonates of alkali metals, such as sodium hydroxide, potassium hydroxide, sodium carbonate and potassium carbonate, ammonia, or the like, and these may be used alone or two or more types thereof may be mixed. A method known to those skilled in the art may be adopted as a method to dropwise add the aqueous alkaline solution to the solution of raw materials. When the dropwise addition is conducted, it is preferable that the aqueous alkaline solution have a pH of 10 or less, and be heated to 40 to 100° C.

It should be noted that in the case of using $SnCl_2$, $SnCl_4$ and $SbCl_3$ as the raw materials described above, when including $SbCl_3$ in the Sn-containing aqueous solution, it is possible to add the aqueous alkaline solution at the same time. Further, in the case of using $SnCl_4$, $SbCl_3$ and $SbCl_5$ as the raw materials described above, when including $SnCl_4$ in the Sb-added aqueous solution, it is possible to add the aqueous alkaline solution at the same time.

After co-precipitating the hydroxides of Sb and Sn, the residual salt is removed by decantation to dry. It is preferable to stop the washing for removing the residual salt at a point where hydrochloric acid remains only slightly, for example, when the electrical conductivity of the hydroxides of Sb and Sn becomes 0.4 mS/cm or less.

In the case of using the powder for applications of coating onto a film or kneading into a substrate, the firing is preferably carried out at 400 to 900° C. If the temperature is less than 400° C., sufficient electrical conductivity cannot be obtained, whereas if the temperature is higher than 900° C., the sintering of antimony-doped tin oxide powder would start, the particle size would be λ/4 or more in the visible light region, and deteriorations in the transparency and haze would occur when the powder is applied onto or kneaded into a film, which is undesirable. However, when it is used as a raw material of a target material or the like, the particle size would be suitable in view of formability. In addition, it is possible to increase the transparency of the antimony-doped tin oxide powder by carrying out the firing in the atmosphere.

As described above, it is possible to produce an antimony-doped tin oxide powder exhibiting high electrical conductivity and high infrared cut-off characteristics.

[Application of Antimony-Doped Tin Oxide Powder]

The transparent conductive antimony-doped tin oxide powder of the present embodiment can be used as a dispersion by being dispersed in a solvent. Here, the solvent is not particularly limited and it is possible to use various solvents, but water, alcohol-based solvents such as ethanol and isopropyl alcohol (IPA), ketone-based solvents such as methyl ethyl ketone, and non-polar solvents such as hexane and toluene are preferred.

The content of antimony-doped tin oxide powder in the dispersion is, based on the mass, from 1 to 70% by mass, and is preferably from 10 to 60% by mass.

When the content is less than 1% by mass, the effect of adding the powder would be small, whereas when the content exceeds 70% by mass, gelation occurs at times, and auxiliaries and the like would be required.

Various conventional additives may be added to the dispersion within a range that does not impair the purpose thereof. Examples of such additives include dispersants, dispersion aids, polymerization inhibitors, curing catalysts, antioxidants, leveling agents, and film-forming resins.

In addition, it is possible to add a resin to the dispersion described above and use the resultant as a coating material. It is preferable to form a coating material using the dispersion in view of achieving a reduction in the dispersion energy or the like at the time of forming the coating material. Here, as the resin, for example, polyvinyl alcohol resins, vinyl chloride-vinyl acetate resins, acrylic resins, epoxy resins, urethane resins, alkyd resins, polyester resins, ethylene-vinyl acetate copolymer resins, acryl-styrene copolymer resins, cellulose resins, phenolic resins, amino resins, fluororesins, silicone resins, petroleum resins, and natural resins, such as shellac, rosin derivatives and rubber derivatives.

The amount of the antimony-doped tin oxide powder added to the resin is from 0.1 to 950 parts by mass and is preferably from 0.7 to 800 parts by mass, relative to 100 parts by mass of the resin. The preferred value changes depending on the electrical resistivity, infrared cut-off characteristics and film thickness of the transparent conductive film that are required.

Further, it is also possible to mix the antimony-doped tin oxide powder and a resin to form a coating material. In this case, a solvent may be added. It is as described above for the resin and solvent to be used and the amount of resin added in the antimony-doped tin oxide powder, and the solvent may be appropriately added in order to adjust the viscosity of the coating material.

By applying and drying the dispersion or coating material on the construction materials and window materials for vehicles, such as automobiles, trains, ships and airplanes, the window materials for housing, the glass plates used in showcases, or the like, it is possible to obtain a heat-ray shielding transparent film exhibiting high electrical conductivity and high infrared cut-off characteristics.

The application of the dispersion, coating material or the like onto a glass plate can be carried out by conventional methods, for example, techniques such as roll coating, spin coating, screen printing, and the use of an applicator. Thereafter, a binder component is heated if necessary to evaporate the solvent, and the coating film is solidified by drying. At this time, it may be heated or irradiated with ultraviolet rays or the like.

From the viewpoints of the transparency, the electrical conductivity and the infrared cut-off characteristics, in the case of a coating film, the thickness of the heat-ray shielding transparent film is preferably from 0.1 to 5 μm, and more preferably from 0.5 to 3 μm. However, if it is kneaded into a resin, the thickness is not limited.

In addition, when the visible light transmittance of the heat-ray shielding transparent film is from 83 to 87%, if the value of [(visible light transmittance)/(solar radiation transmittance)] is 1.25 or more, the infrared cut-off characteristics can be improved. Here, for the measurements of the visible light transmittance and the solar radiation transmittance, the antimony-doped tin oxide powder is dispersed, the resulting dispersed liquid is mixed with a resin to form a coating material, and the thus obtained coating material is applied onto a transparent film and is then dried, to produce a heat-ray shielding composition film. After measuring the visible light transmittance and solar radiation transmittance of the transparent film on which no coating material has been applied as a background, the visible light transmittance and solar radiation transmittance of the film on which a heat-ray shielding composition film has been formed are measured using a spectrophotometer (model number: U-4000) manufactured by Hitachi, Ltd. At this time, if the visible light transmittance of the heat-ray shielding transparent film is from 83 to 87%, the value of [(visible light transmittance)/(solar radiation transmittance)] of the heat-ray shielding transparent film would be from 1.25 to 1.50.

As described above, using the antimony-doped tin oxide powder of the present embodiment, it is possible to supply in the forms of dispersions, coating materials, or the like. In addition, the heat-ray shielding transparent film formed by these can be widely applied to the construction materials and window materials for vehicles, such as automobiles, trains, ships and airplanes, the window materials for housing, the glass plates used in showcases, or the like.

EXAMPLES

As follows is a more detailed description of the present invention based on a series of Examples, although the present invention is not limited to these Examples. In Examples, the L values of the antimony-doped tin oxide powders were measured using a color computer (model number: SM-7) manufactured by Suga Test Instruments Co., Ltd. The BET specific surface areas were measured using a fluid-type, specific surface area automatic measuring device (model number: FlowSorb 2310) manufactured by Shimadzu Corporation. Using a measuring device (model number: DM-7561) manufactured by Yokogawa Electric Corporation, 5 g of a sample was placed in a mold having a cross-sectional area S of 4.9 $cm^2$ and pressurized at 980 N to measure the resistance value (R) and the sample thickness (H) at the time of pressurization, and the powder volume resistivity was determined based on a formula: R (Ω)×S ($cm^2$)/H (cm). The visible light transmittance (% Tv, wavelength range: 380 to 780 nm) and the solar radiation transmittance (% Ts, wavelength range: 300 to 2,500 nm) were measured as follows. First, 20 g of an antimony-doped tin oxide powder was dispersed in 30 g of ion-exchanged water, and the resulting dispersion was diluted 2-fold (mass ratio) with water. 50.0 g of the diluted solution was mixed with 45.5 g of an aqueous solution of 22% by mass of an urethane-based thermosetting resin (dispersion type) to give a mass ratio of the antimony-doped tin oxide powder and the resin of 1:1, thereby producing a coating material. The mixed coating material was applied with a thickness of 2 μm onto PET film (thickness: 100 μm, haze: 2.0%, total light transmittance: 90%). Then, using a spectrophotometer (model number: U-4000) manufactured by Hitachi, Ltd., after measuring the visible light transmittance and solar radiation transmittance of the PET film on which no coating material had been applied as a background, the visible light transmittance and solar radiation transmittance of the PET film on which a heat-ray shielding composition film had been formed were measured, thereby determining the visible light transmittance and solar radiation transmittance of the heat-ray shielding composition film and calculating the ratio of (visible light transmittance)/(solar radiation transmittance) ([(% Tv)/(% Ts)]).

Example 1

Case of Combining $Sn^{4+}$ with $Sb^{3+}$ and $Sb^{5+}$ 9.9 g of a 50% by mass aqueous $SbCl_3$ solution (containing 2.64 g (0.022 mol) of a Sb metal) was mixed with 16.2 g of a 40% by mass aqueous $SbCl_5$ solution (containing 3.36 g (0.028 mol) of a Sb metal) such that the molar ratio of Sb will be a ratio of 9.8 moles relative to a total of 100 moles of Sb and Sn, and the resulting antimony chloride mixture was further mixed with 237.0 g of a 50% by mass aqueous $SnCl_4$ solution (containing 54 g (0.455 mol) of a Sn metal). The resulting mixture was added dropwise into an aqueous solution of NaOH (90 g/1.2 $dm^3$) with stirring under heating at 80° C., and the final pH was adjusted to 7 to co-precipitate the hydroxides of Sn and Sb. Then, the resultant was left to stand to precipitate the co-precipitated hydroxides of Sn and Sb, the supernatant liquid was removed, followed by the addition of ion-exchanged water, and an operation of the standing/precipitation and the supernatant liquid removal was carried out repeatedly until the electrical conductivity of the supernatant liquid became 200 µS/cm or less. The precipitates of the co-precipitated hydroxides of Sn and Sb were filtered, dried, and then fired for 2 hours in the atmosphere at 600° C. The specific surface area, the chromaticity (L, a, b) and the powder volume resistivity of the thus obtained antimony-doped tin oxide powder were measured. Furthermore, 20 g of the antimony-doped tin oxide powder was dispersed in 20 g of ion-exchanged water, and using the resulting dispersion, the visible light transmittance (% Tv) and the solar radiation transmittance (% Ts) were determined to calculate the ratio of (visible light transmittance)/(solar radiation transmittance) ([(% Tv)/(% Ts)]).

Examples 2 and 3, and Comparative Examples 1 and 2

Cases of Combining $Sn^{4+}$ with $Sb^{3+}$ and $Sb^{5+}$

Antimony-doped tin oxide powders were produced in the same manner as in Example 1, with the exception that the ratios were those shown in Table 4, and the respective characteristics of the thus obtained antimony-doped tin oxide powders were measured. The results when $Sn^{4+}$ was combined with $Sb^{3+}$ and $Sb^{5+}$ are shown in Table 4.

Example 4

Case of Combining $Sn^{4+}$ and $Sn^{2+}$ with $Sb^{3+}$ 209.2 g of a 40% by mass aqueous $SnCl_2$ solution (containing 52.38 g (0.441 mol) of a Sn metal) was mixed with 7.1 g of a 50% by mass aqueous $SnCl_4$ solution (containing 1.62 g (0.014 mol) of a Sn metal) such that the molar ratio of Sb will be a ratio of 9.8 moles relative to a total of 100 moles of Sb and Sn, and 22.5 g of a 50% by mass aqueous $SbCl_3$ solution (containing 6.0 g (0.049 mol) of a Sb metal) was further mixed with the tin chloride mixture. The rest of the operation was carried out by the method described in Example 1. These results are shown in Table 5.

Examples 5 and 6, and Comparative Examples 3 and 4

Cases of Combining $Sn^{4+}$ and $Sn^{2+}$ with $Sb^{3+}$

Antimony-doped tin oxide powders were produced in the same manner as in Example 4, with the exception that the ratios were those shown in Table 5, and the respective characteristics of the thus obtained antimony-doped tin oxide powders were measured. The results when $Sn^{4+}$ and $Sn^{2+}$ were combined with $Sb^{3+}$ are shown in Table 5.

Example 7

Case of Combining $Sn^{4+}$ and $Sn^{2+}$ with $Sb^{3+}$ and $Sb^{5+}$ 15.0 g of a 50% by mass aqueous $SbCl_3$ solution (containing 4.0 g (0.033 mol) of a Sb metal) was mixed with 12.3 g of a 40% by mass aqueous $SbCl_5$ solution (containing 2.0 g (0.016 mol) of a Sb metal) such that the molar ratio of Sb will be a ratio of 9.8 moles relative to a total of 100 moles of Sb and Sn, to prepare an antimony chloride mixture A. Then, a tin chloride mixture B was prepared, which was a mixture of 64.7 g of a 40% by mass aqueous $SnCl_2$ solution (containing 16.2 g (0.136 mol) of a Sn metal) and 165.9 g of a 50% by mass aqueous $SnCl_4$ solution (containing 37.8 g (0.318 mol) of a Sn metal). Then, the antimony chloride mixture A was mixed with the tin chloride mixture B. The rest of the operation was carried out by the method described in Example 1. These results are shown in Table 6.

Examples 8 and 9, and Comparative Example 5

Cases of Combining $Sn^{4+}$ and $Sn^{2+}$ with $Sb^{3+}$ and $Sb^{5+}$

Antimony-doped tin oxide powders were produced in the same manner as in Example 7, with the exception that the ratios were those shown in Table 6, and the respective characteristics of the thus obtained antimony-doped tin oxide powders were measured. The results when $Sn^{4+}$ and $Sn^{2+}$ were combined with $Sb^{3+}$ and $Sb^{5+}$ are shown in Table 6.

TABLE 4

|  | Comp. Ex. 1 | Ex. 1 | Ex. 2 | Ex. 3 | Comp. Ex. 2 |
| --- | --- | --- | --- | --- | --- |
| $Sb^{5+}$ ratio | 0.3 | 0.44 | 0.5 | 0.6 | 0.7 |
| $Sb^{3+}$ ratio | 0.7 | 0.56 | 0.5 | 0.4 | 0.3 |
| Ratio of average ionic radius (Sn = 1) | 1.09 | 1.04 | 1.02 | 0.98 | 0.95 |
| Firing temperature (° C.) | 600 | 600 | 600 | 600 | 600 |
| Firing time (hour) | 2 | 2 | 2 | 2 | 2 |
| L value | 39.5 | 38.3 | 38.0 | 38.5 | 39.3 |
| BET specific surface area ($m^2$/g) | 76 | 73 | 74 | 71 | 79 |
| Powder volume resistivity (Ω · cm) | 1.4 | 0.6 | 0.5 | 0.9 | 1.7 |
| Visible light transmittance (% Tv) | 86.1 | 85.2 | 85.3 | 84.6 | 85.9 |
| Solar radiation transmittance (% Ts) | 69.2 | 66.1 | 66.0 | 65.8 | 70.0 |
| (% Tv)/(% Ts) | 1.24 | 1.29 | 1.29 | 1.29 | 1.23 |

TABLE 5

|  | Comp. Ex. 3 | Ex. 4 | Ex. 5 | Ex. 6 | Comp. Ex. 4 |
|---|---|---|---|---|---|
| $Sn^{4+}$ ratio | 0.00 | 0.03 | 0.1 | 0.3 | 0.5 |
| $Sn^{2+}$ ratio | 1.00 | 0.97 | 0.9 | 0.7 | 0.5 |
| Ratio of average ionic radius (Sn = 1) | 0.957 | 0.963 | 0.98 | 1.02 | 1.07 |
| Firing temperature (° C.) | 600 | 600 | 600 | 600 | 600 |
| Firing time (hour) | 2 | 2 | 2 | 2 | 2 |
| L value | 40.0 | 37.9 | 37.1 | 38.5 | 39.6 |
| BET specific surface area ($m^2$/g) | 84 | 84 | 82 | 83 | 80 |
| Powder volume resistivity (Ω · cm) | 1.8 | 0.9 | 0.5 | 0.7 | 1.6 |
| Visible light transmittance (% Tv) | 86.2 | 85.6 | 85.7 | 85.9 | 85.8 |
| Solar radiation transmittance (% Ts) | 70.2 | 67.7 | 67.7 | 67.8 | 70.0 |
| (% Tv)/(% Ts) | 1.23 | 1.26 | 1.27 | 1.27 | 1.23 |

TABLE 6

|  | Comp. Ex. 5 | Ex. 7 | Ex. 8 | Ex. 9 |
|---|---|---|---|---|
| $Sn^{4+}$ ratio | 0.4 | 0.7 | 0.8 | 0.6 |
| $Sn^{2+}$ ratio | 0.6 | 0.3 | 0.2 | 0.4 |
| Ratio of average ionic radius (Sn = 1) | 0.94 | 1.00 | 1.03 | 0.98 |
| Firing temperature (° C.) | 600 | 600 | 600 | 600 |
| Firing time (hour) | 2 | 2 | 2 | 2 |
| L value | 39.3 | 38.3 | 36.3 | 37.1 |
| BET specific surface area ($m^2$/g) | 84 | 83 | 78 | 77 |
| Powder volume resistivity (Ω · cm) | 1.5 | 0.6 | 0.7 | 0.9 |
| Visible light transmittance (% Tv) | 85.9 | 85.8 | 85.4 | 85.6 |
| Solar radiation transmittance (% Ts) | 70.2 | 67.6 | 67.9 | 67.1 |
| (% Tv)/(% Ts) | 1.22 | 1.27 | 1.26 | 1.27 |

As can be seen from Tables 4 to 6, it was confirmed that in all of Examples 1 to 9 where the ratio of the ionic radii of Sb and Sn was controlled, the powder volume resistivity was reduced. It is thought that this is due to an increase in the degree of crystallinity. In addition, in all of Examples 1 to 9, the ratio of [(visible light transmittance)/(solar radiation transmittance)] had shown a very high value of 1.26 or more, and it was found that the heat ray cutoff performance was improved significantly. It should be noted that in all of Examples 1 to 9, the L values were not greater than 50 and the specific surface areas were at least 50 $m^2$/g, which were within the desired ranges. On the other hand, in Comparative Examples 1 to 5 where the ratio of the ionic radii of Sb and Sn was outside the predetermined range, the ratio of (visible light transmittance)/(solar radiation transmittance) was as low as 1.24 or less.

Example 10

Case of Combining $Sn^{4+}$ with $Sb^{3+}$ and $Sb^{5+}$ 29.3 g of a 50% by mass aqueous $SbCl_3$ solution (containing 7.81 g (0.064 mol) of a Sb metal) was mixed with 48.0 g of a 40% by mass aqueous $SbCl_5$ solution (containing 7.81 g (0.064 mol) of a Sb metal) such that the molar ratio of Sb will be a ratio of 22 moles relative to a total of 100 moles of Sb and Sn, and the resulting antimony chloride mixture was further mixed with 237.0 g of a 50% by mass aqueous $SnCl_4$ solution (containing 54 g (0.455 mol) of a Sn metal). The resulting mixture was added dropwise into an aqueous solution of NaOH (110 g/1.2 $dm^3$) with stirring under heating at 80° C., and the final pH was adjusted to 7 to co-precipitate the hydroxides of Sn and Sb. Then, the resultant was left to stand to precipitate the co-precipitated hydroxides of Sn and Sb, the supernatant liquid was removed, followed by the addition of ion-exchanged water, and an operation of the standing/precipitation and the supernatant liquid removal was carried out repeatedly until the electrical conductivity of the supernatant liquid became 200 μS/cm or less. The precipitates of the co-precipitated hydroxides of Sn and Sb were filtered, dried, and then fired for 2 hours in the atmosphere at 650° C. to obtain an antimony-doped tin oxide powder. The specific surface area, the chromaticity (L, a, b), the powder volume resistivity and the X-ray diffraction of the thus obtained antimony-doped tin oxide powder were measured. The results of X-ray diffraction are shown in FIG. 1. Furthermore, 20 g of the antimony-doped tin oxide powder was dispersed in 30 g of ion-exchanged water, and using the resulting dispersion, the visible light transmittance (% Tv) and the solar radiation transmittance (% Ts) were determined to calculate the ratio of (visible light transmittance)/(solar radiation transmittance) ([(% Tv)/(% Ts)]). These results are shown in Table 7.

Comparative Example 6

Case of Combining $Sn^{4+}$ with $Sb^{3+}$ 58.5 g of a 50% by mass aqueous $SbCl_3$ solution (containing 15.6 g (0.128 mol) of a Sb metal) was mixed with the antimony chloride mixture and 237.0 g of a 50% by mass aqueous $SnCl_4$ solution (containing 54 g (0.455 mol) of a Sn metal), such that the molar ratio of Sb will be a ratio of 22 moles relative to a total of 100 moles of Sb and Sn. The rest was carried out by the method described in Example 10 to prepare an antimony-doped tin oxide powder, and the antimony-doped tin oxide powder was evaluated. These results are shown in Table 7, and the results of X-ray diffraction are shown in FIG. 2.

TABLE 7

|  | Ex. 10 | Comp. Ex. 6 |
|---|---|---|
| $Sb^{5+}$ ratio | 0.5 | 0.0 |
| $Sb^{3+}$ ratio | 0.5 | 1.0 |
| Ratio of average ionic radius (Sn = 1) | 1.02 | 1.20 |
| Firing temperature (° C.) | 650 | 650 |
| Firing time (hour) | 2 | 2 |
| L value | 36.5 | 39.5 |
| BET specific surface area ($m^2$/g) | 78 | 84 |
| Powder volume resistivity (Ω · cm) | 1.2 | 3.3 |
| Visible light transmittance (% Tv) | 83.9 | 83.8 |
| Solar radiation transmittance (% Ts) | 60.1 | 67.3 |
| (% Tv)/(% Ts) | 1.40 | 1.24 |

Figure 2:
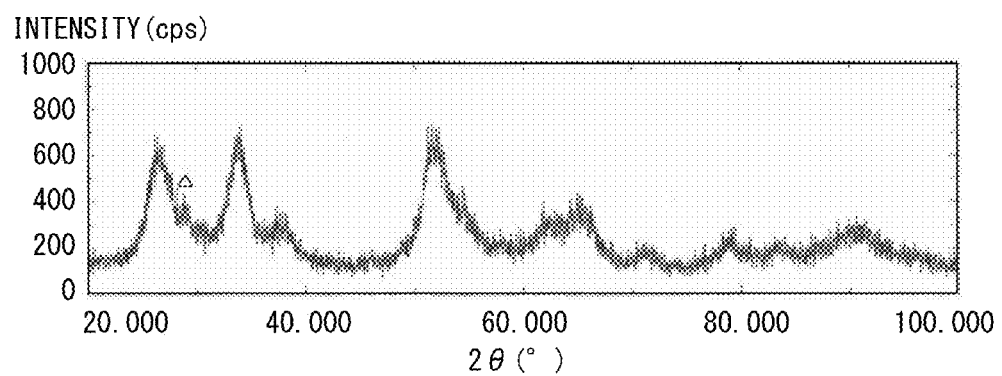
FIG. 2 is a diagram showing the result of X-ray diffraction of the antimony tin oxide powder of Comparative Example 6.

As is apparent by comparing FIG. 1 and FIG. 2, even when the ratios of Sn and Sb were the same, in Example 10 where the ionic radius was controlled, the peak of antimony oxide was not observed, whereas in Comparative Example 6, the peak of antimony oxide occurred at an angle 2θ of 29° (indicated by the white triangle in FIG. 2). It was confirmed, also from this observation, that the efficiency of doping is increased by controlling the ionic radius. In addition, as can be seen from Table 7, in Example 10, the powder volume resistivity of the antimony-doped tin oxide powder was lower than that in Comparative Example 6. The heat-ray shielding transparent films containing these antimony-doped tin oxide powders exhibited low solar radiation transmittance, the ratio of (visible light transmittance)/(solar radiation transmittance) ([(% Tv)/(% Ts)]) of the heat-ray shielding transparent film had shown a high value, and the infrared cut-off characteristics were favorable. It should be noted that in Comparative Example 6, the ratio of (visible light transmittance)/(solar radiation transmittance) ([(% Tv)/(% Ts)]) was 1.24, and the powder volume resistivity was as high as 3.3 Ω·cm.

The invention claimed is:

1. An antimony-doped tin oxide powder comprising the following (A) to (C):
   (A) including at least three kinds of ions selected from the group consisting of $Sn^{2+}$, $Sn^{4+}$, $Sb^{3+}$ and $Sb^{5+}$;
   (B) having a ratio of an average Sn ionic radius which is an average of $Sn^{2+}$ ionic radius and $Sn^{4+}$ ionic radius, to an average Sb ionic radius which is an average of $Sb^{3+}$ ionic radius and $Sb^{5+}$ ionic radius, which is represented by the following formula (1); and
   (C) having an Sb content of 5 to 25 moles relative to a total of 100 moles of Sb and Sn, wherein (average Sn ionic radius):(average Sb ionic radius)=1:(0.96 to 1.04)  (1).

2. A dispersion obtained by dispersing the antimony-doped tin oxide powder according to claim 1 in a solvent.

3. A coating material comprising:
   the antimony-doped tin oxide powder according to claim 1; and
   a resin.

4. A heat-ray shielding transparent film comprising the antimony-doped tin oxide powder according to claim 1.

5. The heat-ray shielding transparent film according to claim 4, wherein
   a value of [(visible light transmittance)/(solar radiation transmittance)] is at least 1.25 when the visible light transmittance is from 83 to 87%.

6. A method of producing an antimony-doped tin oxide powder, the method comprising:
   co-precipitating hydroxides of Sb and Sn from an aqueous solution of a raw material; and
   firing co-precipitated hydroxides, wherein
   the raw material comprises at least three types selected from the group consisting of $SnCl_2$, $SnCl_4$, $SbCl_3$ and $SbCl_5$,
   a ratio of an average Sn ionic radius which is an average of $Sn^{2+}$ ionic radius and $Sn^{4+}$ ionic radius, to an average Sb ionic radius which is an average of $Sb^{3+}$ ionic radius and $Sb^{5+}$ ionic radius, is represented by the following formula (2); and
   an Sb content is 5 to 25 moles relative to a total of 100 moles of Sb and Sn, wherein (average Sn ionic radius):(average Sb ionic radius)=1:(0.96 to 1.04)  (2).

7. The method of producing an antimony-doped tin oxide powder according to claim 6, further comprising:
   a step of preparing an Sn-containing aqueous solution including $SnCl_2$ and $SnCl_4$, which contains $SnCl_4$ in an amount of 2 to 40 moles relative to a total of 100 moles of $SnCl_2$ and $SnCl_4$;
   a step of preparing a Sb-added aqueous solution containing $SbCl_3$; and
   a step of mixing the Sn-containing aqueous solution and the Sb-added aqueous solution to prepare a Sb-added, Sn-containing aqueous solution, wherein
   hydroxides of Sb and Sn are co-precipitated from the Sb-added, Sn-containing aqueous solution.

8. The method of producing an antimony-doped tin oxide powder according to claim 6, further comprising:
   a step of preparing a Sb-added aqueous solution including $SbCl_3$ and $SbCl_5$, which contains $SbCl_5$ in an amount of 44 to 66 moles relative to a total of 100 moles of $SbCl_3$ and $SbCl_5$;
   a step of preparing an Sn-containing aqueous solution including $SnCl_4$; and
   a step of mixing the Sb-added aqueous solution and the Sn-containing aqueous solution to prepare a Sb-added, Sn-containing aqueous solution, wherein
   hydroxides of Sb and Sn are co-precipitated from the Sb-added, Sn-containing aqueous solution.

* * * * *